(12) United States Patent
Cathcart (10) Patent No.: US 8,544,247 B2
(45) Date of Patent: Oct. 1, 2013

(54) ROTATABLE STRING TRIMMER (76) Inventor: Jimmy Lawrence Cathcart, Rock Hill, SC (US)

( * ) Notice: Subject to any disclaimer, the term of this patent is extended or adjusted under 35 U.S.C. 154(b) by 0 days.

(21) Appl. No.: 13/329,674

(22) Filed: Dec. 19, 2011

(65) Prior Publication Data

US 2013/0152537 A1    Jun. 20, 2013

(51) Int. Cl.
*A01D 34/00*    (2006.01)

(52) U.S. Cl.
USPC ............................................................ 56/12.7

(58) Field of Classification Search
USPC ............ 56/12.1, 12.7, 13.6, 13.7, 16.7, 17.1, 56/17.2, 17.5, DIG. 18; 30/276
See application file for complete search history.

(56) References Cited

U.S. PATENT DOCUMENTS

| 3,490,213 | A | * | 1/1970 | Pinto ............................... 56/16.9 |
| 3,668,845 | A | * | 6/1972 | Parker ............................. 56/11.6 |
| 3,782,085 | A | * | 1/1974 | Parker et al. .................... 56/11.6 |
| 4,077,191 | A | | 3/1978 | Pittinger, Sr. et al. |
| 4,936,886 | A | | 6/1990 | Quillen |
| 5,423,126 | A | | 6/1995 | Byrne |
| 5,577,374 | A | | 11/1996 | Huston |
| 5,970,694 | A | | 10/1999 | Knox, Jr. |
| 6,256,970 | B1 | * | 7/2001 | Fleener .......................... 56/12.7 |
| 6,345,489 | B1 | | 2/2002 | Everts et al. |
| 6,415,585 | B2 | | 7/2002 | Morabit |
| 7,584,542 | B2 | | 9/2009 | Smith |
| 2008/0134522 | A1 | | 6/2008 | Hurley |
| 2008/0282554 | A1 | | 11/2008 | Grace |
| 2009/0188354 | A1 | | 7/2009 | Harris |

* cited by examiner

*Primary Examiner* — Thomas B Will
*Assistant Examiner* — Mai Nguyen
(74) *Attorney, Agent, or Firm* — Summa, Additon & Ashe, P.A.

(57) ABSTRACT

The present invention relates to a rotatable string trimmer. The string trimmer typically includes a primary support, at least two wheels attached to the primary support, and an engine attached to the primary support. The string trimmer typically includes a trimmer portion, which has a rotatable trimmer head and cutting line attached to the rotatable trimmer head. The trimmer portion is capable of rotating between a trimming position and an edging position. The string trimmer also typically includes a rotatable handle bar that has a first handle-bar portion and a second handle-bar portion. The rotatable handle bar is typically in communication with the trimmer portion.

14 Claims, 8 Drawing Sheets

ROTATABLE STRING TRIMMER

FIELD OF THE INVENTION

The present invention relates to a rotatable string trimmer.

BACKGROUND

String trimmers are commonly used to cut grass and other vegetation. Both hand-held and wheel-mounted string trimmers are commonly employed. U.S. Pat. No. 4,936,886 discloses a wheel-mounted string trimmer having a trimmer head that is capable of rotating between a horizontal plane and a vertical plane. This rotation of the trimmer head facilitates both trimming and edging operations. That said, the steps required for rotating the trimmer head are rather involved. Accordingly, a need exists for an improved string trimmer capable of performing both trimming and edging operations. What is more, a need exists for an improved string trimmer that is better able to protect its operator from debris.

SUMMARY

Accordingly, in one aspect, the present invention embraces a rotatable string trimmer. The string trimmer typically includes a primary support, at least two wheels attached to the primary support, and an engine (e.g., a gasoline engine) attached to the primary support. The string trimmer includes a trimmer portion, which has a rotatable trimmer head and cutting line attached to the rotatable trimmer head. The rotatable trimmer head defines a cutting plane. To facilitate both trimming and edging operations, the trimmer portion is capable of rotating between a trimming position and an edging position.

A drive-shaft housing connects the trimmer portion to the primary support. A drive shaft positioned substantially within the drive-shaft housing transfers rotational motion from the engine to the rotatable trimmer head.

The string trimmer also includes a rotatable handle bar that has a first handle-bar portion and a second handle-bar portion. A handle-bar support connects the rotatable handle bar to the primary support. The rotatable handle bar is in communication with the trimmer portion such that: (i) the first handle-bar portion is in a user position when the trimmer portion is in a trimmer position, (ii) the second handle-bar portion is in a user position when the trimmer portion is in an edging position, and (iii) the second handle bar is positioned on the opposite side of the string trimmer as the trimmer portion when the trimmer portion is in an edging position.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces a rotatable string trimmer. In this regard, FIG. 1 depicts an exemplary rotatable string trimmer 10 in accordance with the present invention.

Figure 1:
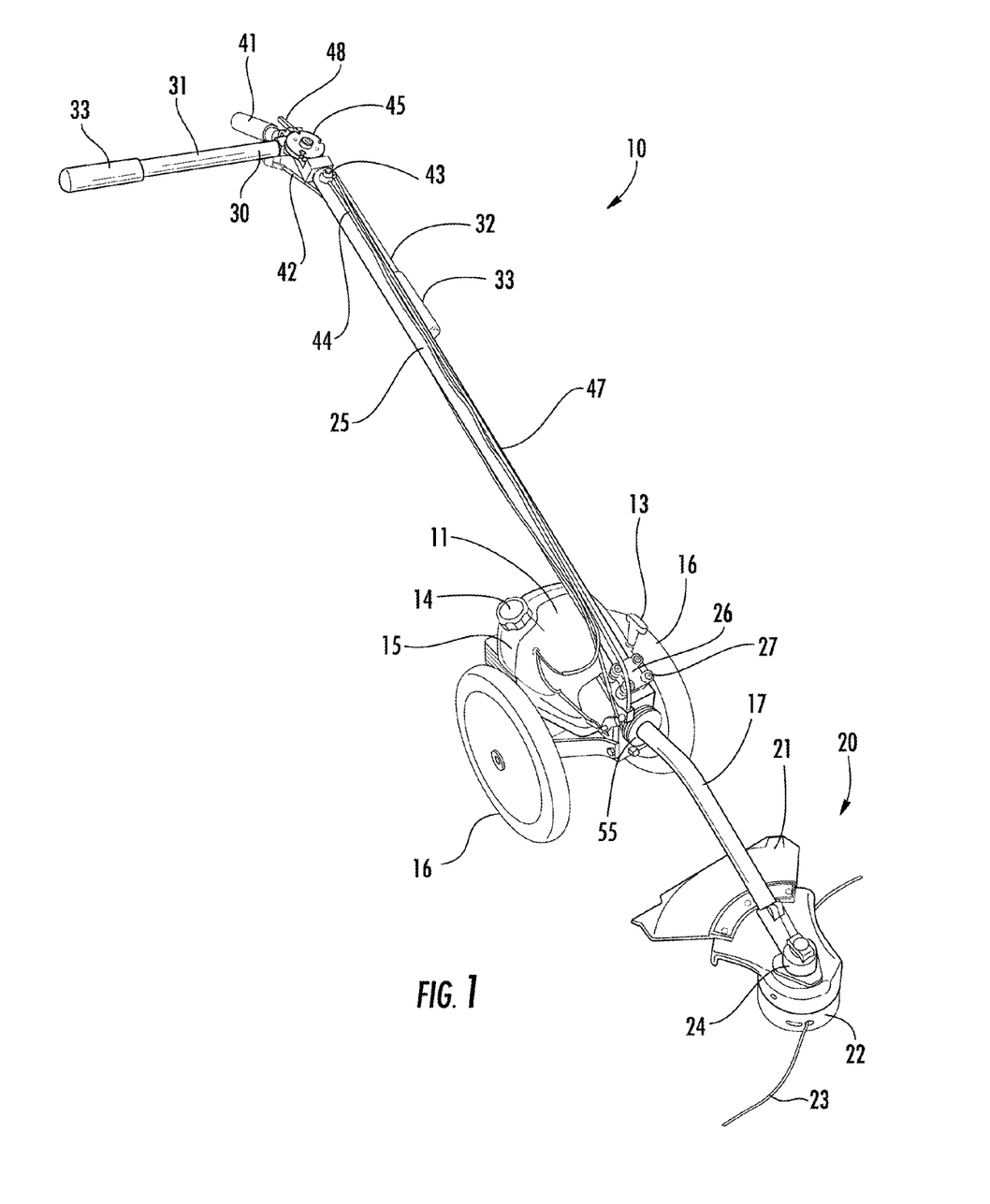
FIG. 1 schematically depicts a rotatable string trimmer in accordance with the present invention.

As depicted in FIG. 1, the rotatable string trimmer 10 includes an engine 11 and two wheels 16 mounted on a support 12 (e.g., a primary support). The engine 11 typically includes a gasoline storage tank 15. A gas cap 14 typically provides access to the gasoline storage tank 15. The engine also typically includes a pull cord 13 for starting the engine 11. Although FIG. 1 depicts the engine 11 as being a gasoline engine, other types of engines, such as an electric motor, are within the scope of the present invention.

A trimmer portion 20 is typically connected to the support 12 via a drive-shaft housing 17. A drive shaft is typically included within (e.g., substantially enclosed within) the drive-shaft housing 17. The drive shaft transfers rotational motion from the engine 11 to the trimmer portion 20.

The trimmer portion 20 typically includes a trimmer head 22, with cutting line 23 (e.g., nylon string) being attached to the trimmer head 22. The trimmer head 22 typically rotates counterclockwise (i.e., counterclockwise from the vantage point of someone above the trimmer head). The trimmer portion 20 also typically a gear housing 24, which has gears for transferring rotational motion from the drive shaft to the trimmer head 22. As depicted in FIG. 1, the trimmer portion 20 typically includes a shield 21 for directing debris away from a user of the rotatable string trimmer 10.

Figure 3:
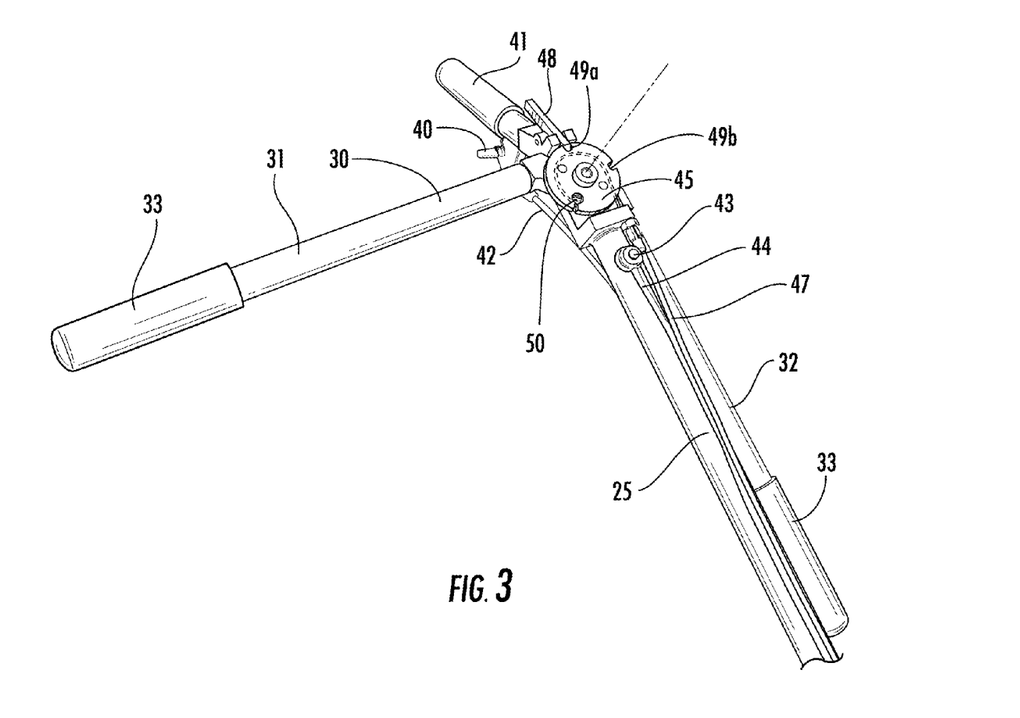
FIG. 3 schematically depicts a rotatable handle bar in accordance with the present invention.

A handle-bar support 25 is typically connected to the engine 11 and to the support 12 via a clamp 26 and bolts 27. As depicted in FIG. 3, a throttle control lever 40 and a throttle handle 41 are typically connected to the end of the handle-bar support 25. A throttle cable 42 connects the throttle control lever 40 to the engine 11. The throttle control lever 40 enables a user to control the power output of the engine 11.

A kill switch 43 is typically attached to the handle-bar support 25. A kill-switch cable 44 connects the kill switch 43 to the engine 11. The kill switch 43 facilitates quick cutoff of the engine 11.

A rotatable handle bar 30 is rotatably connected to the handle-bar support 25. The rotatable handle bar 30 is depicted in more detail in FIG. 3. The rotatable handle bar 30 includes a first handle-bar portion 31 and a second handle-bar portion 32. Each handle-bar portion typically includes a grip 33. Typically, the first handle-bar portion 31 and the second handle-bar portion 32

Figure 2:
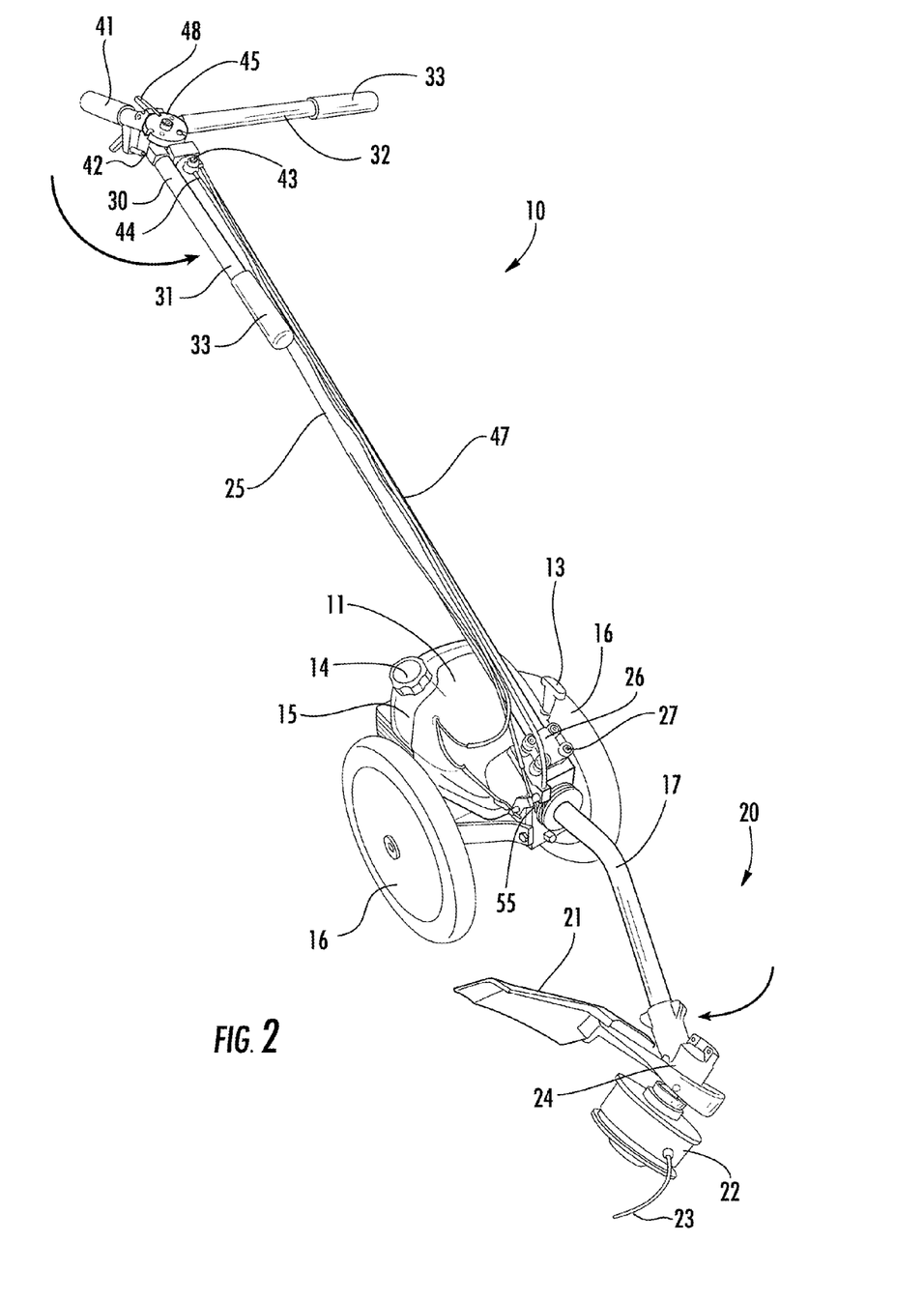
FIG. 2 schematically depicts a rotatable string trimmer having a trimmer portion in an edging position in accordance with the present invention.

As depicted in FIG. 2, the rotatable handle bar 30 and the trimmer portion 20 are capable of rotating between a trimming position, depicted in FIG. 1, and an edging position, depicted in FIG. 2. In the trimming position, the cutting plane of the trimmer portion 20 (i.e., the plane defined by the cutting line 23 when the trimmer head 22 rotates) is typically approximately parallel to the ground. In other words, in the trimming position, the cutting plane of the trimmer portion 20 would be approximately parallel to a flat surface upon which the rotatable string trimmer 10 is positioned. Moreover, in the trimming position the first handle-bar portion 31 is in a user position (e.g., approximately perpendicular to the handle-bar support 12). In the edging position, the cutting plane of the trimmer portion 20 is positioned at an angle (e.g., between about 30° and 90°, such as about 45°) relative to the ground. Preferably, the cutting angle for edging is typically about 90°. Furthermore, in the edging position the second handle-bar portion 32 is in a user position (e.g., approximately perpendicular to the handle-bar support 12). What is more, in the edging position the second handle-bar portion 32 is positioned on the opposite side of the rotatable string trimmer 10 as the trimmer portion 20. For example, FIG. 2 depicts the trimmer portion 20 being on the right side and the second handle-bar portion 32 being on the left side of the rotatable string trimmer 10. This positioning prevents debris being thrown reward from hitting a user.

To facilitate rotation, the rotatable handle bar 30 is typically attached to a handle-bar pulley 45 and the drive-shaft housing 17 is typically attached to a drive-shaft-housing pulley 55. A pulley cable 46 connects the handle-bar pulley 45 and the drive-shaft-housing pulley 55. The pulley cable 46 is typically positioned within a pulley-cable jacket 47, which runs between the handle-bar pulley 45 and the drive-shaft-housing pulley 55.

FIGS. 3-8 depict the operation of the handle-bar pulley 45 in more detail. In this regard, the pulley cable 46 is typically attached to the handle-bar pulley 45 at a bolt 50.

Figure 4:
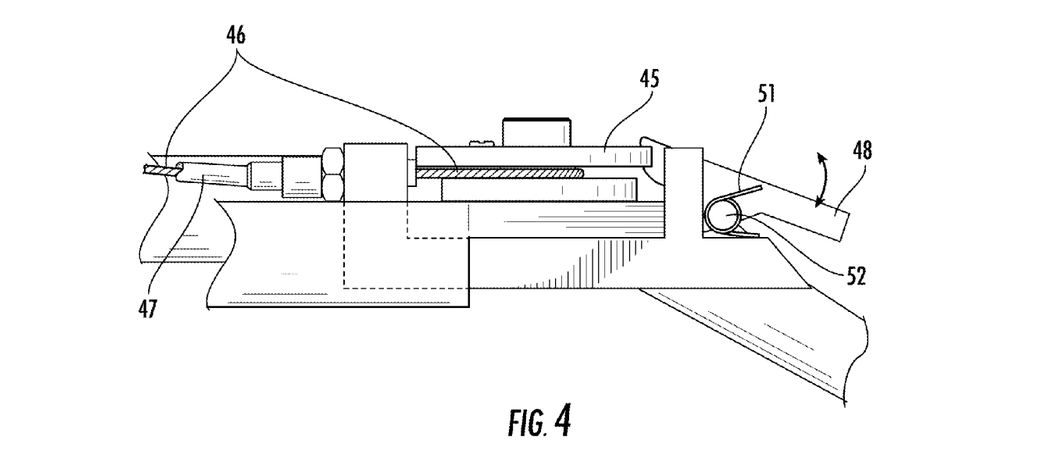
FIG. 4 schematically depicts a handle-bar pulley in accordance with the present invention.

The rotatable string trimmer 10 typically includes a locking mechanism 48 for securing the rotatable handle bar 30. In other words, when the locking mechanism 48 is engaged, the handle-bar pulley 45 is prevented from rotating. The handle-bar pulley 45 typically includes two locking grooves 49a and 49b that can be engaged by the locking mechanism 48. The locking mechanism 48 is movably connected to the handle-bar support 25 with a bolt 52. A spring 51 secures the locking mechanism 48 when it is engaged with one of the locking grooves.

Figures 5, 6:
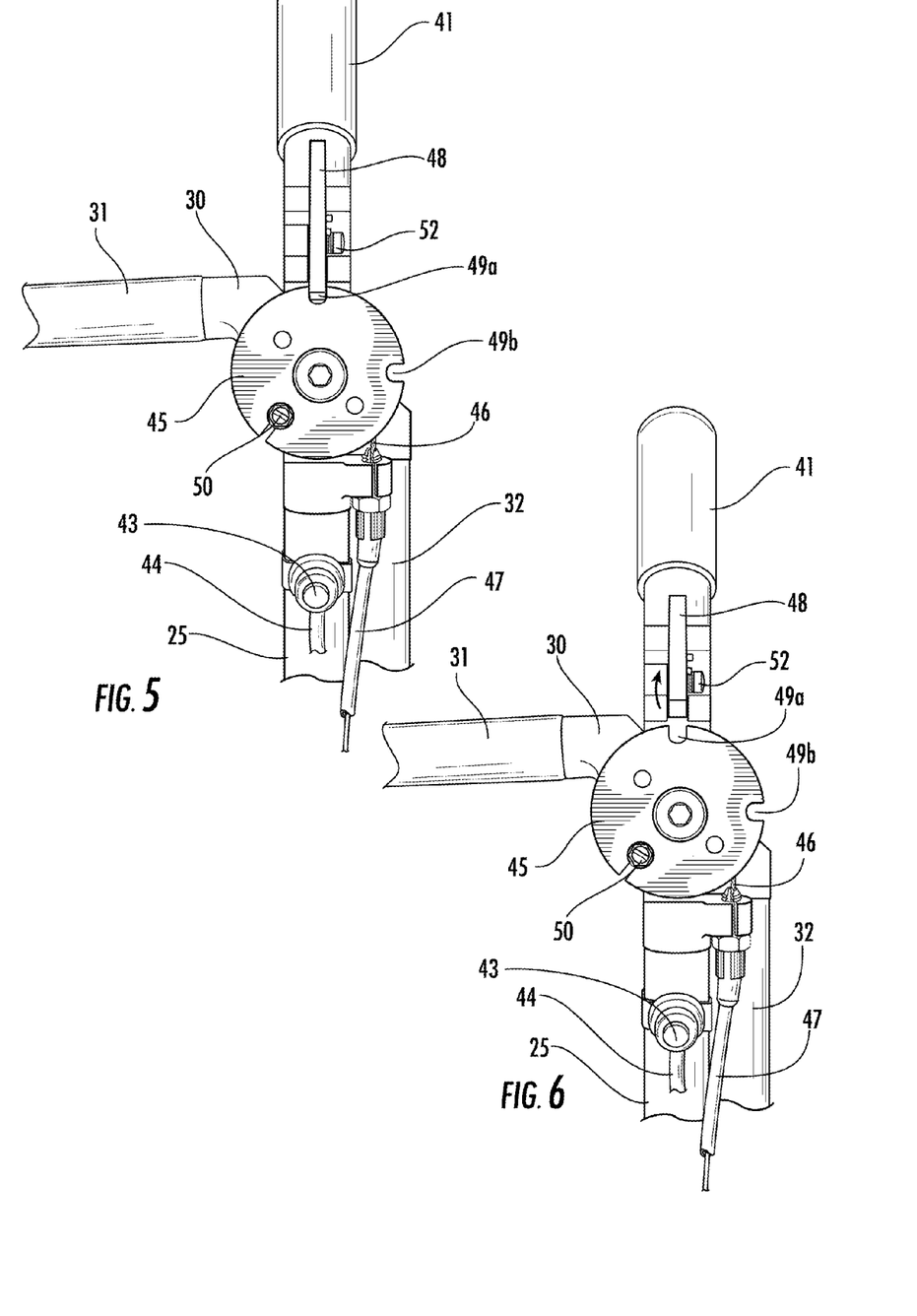
FIGS. 5-8 schematically depict a rotatable handle bar being rotated between a trimming position and an edging position.
Figures 7, 8:
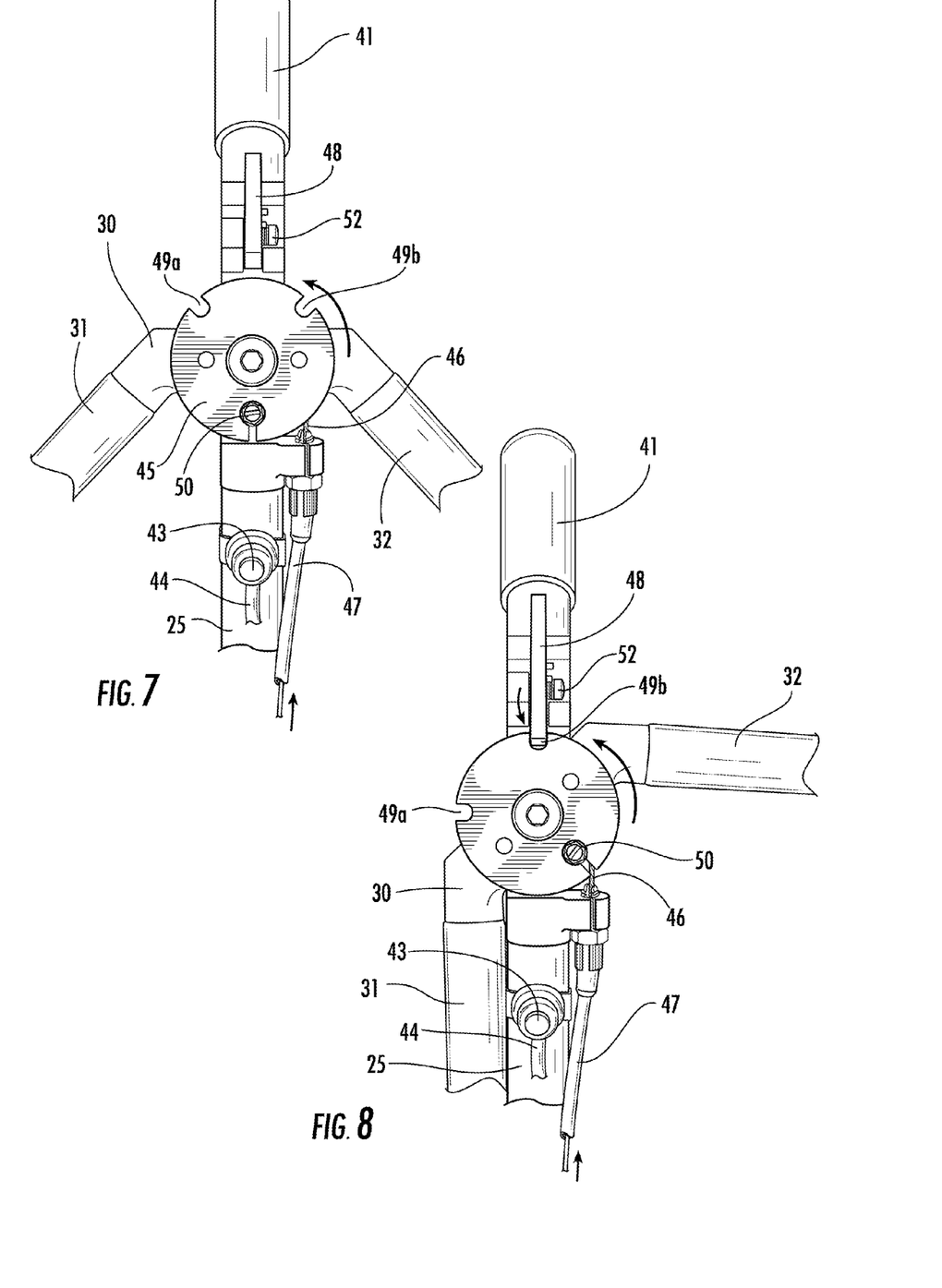

FIGS. 5-8, depict the rotatable handle bar 30 being rotated between the trimming position and the edging position. As depicted in FIG. 5, when the first locking groove 49a is engaged by the locking mechanism 48, the rotatable handle bar 30 is in the trimming position. Before rotating the rotatable handle bar 30, the locking mechanism 48 should be released (e.g., as depicted in FIG. 6). Next, as depicted in FIG. 7, the rotatable handle bar 30 is rotated (e.g., counterclockwise). The rotation of the rotatable handle bar 30 causes the handle-bar pulley 45 to rotate. The rotation of the handle-bar pulley 45 causes the pulley cable 46 to wind around the handle-bar pulley 45. As depicted in FIG. 8, once the rotatable handle bar 30 has been rotated to the edging position the locking mechanism 48 engages the second locking groove 49b.

Figure 9:
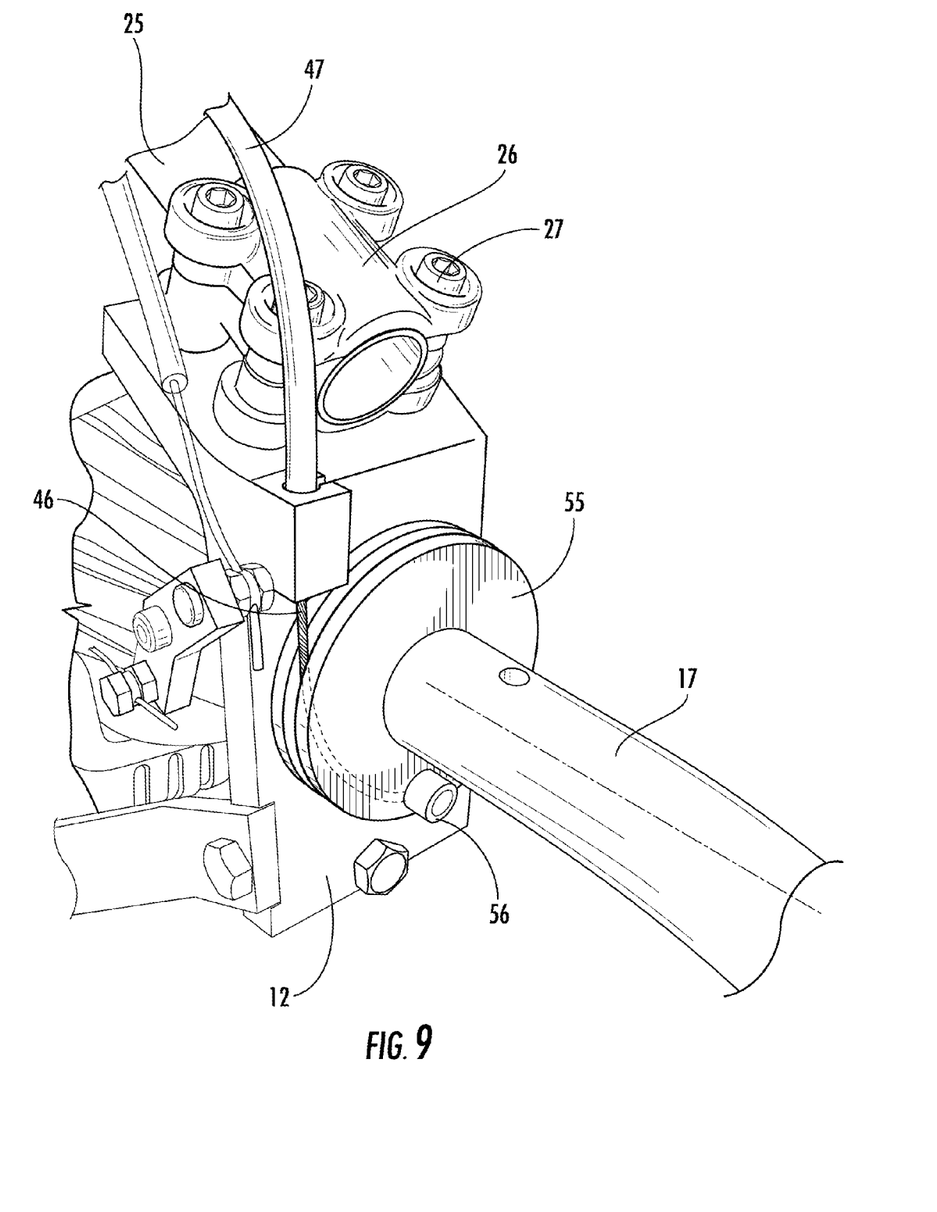
FIG. 9 schematically depicts a drive-shaft-housing pulley in accordance with the present invention.

FIG. 9 depicts the operation of the drive-shaft-housing pulley 55 in more detail. As previously noted, the drive-shaft housing 17 is attached to the drive-shaft-housing pulley 55. The pulley cable 46 is typically attached to the drive-shaft-housing pulley 55 at a bolt 56.

Figures 10, 11:
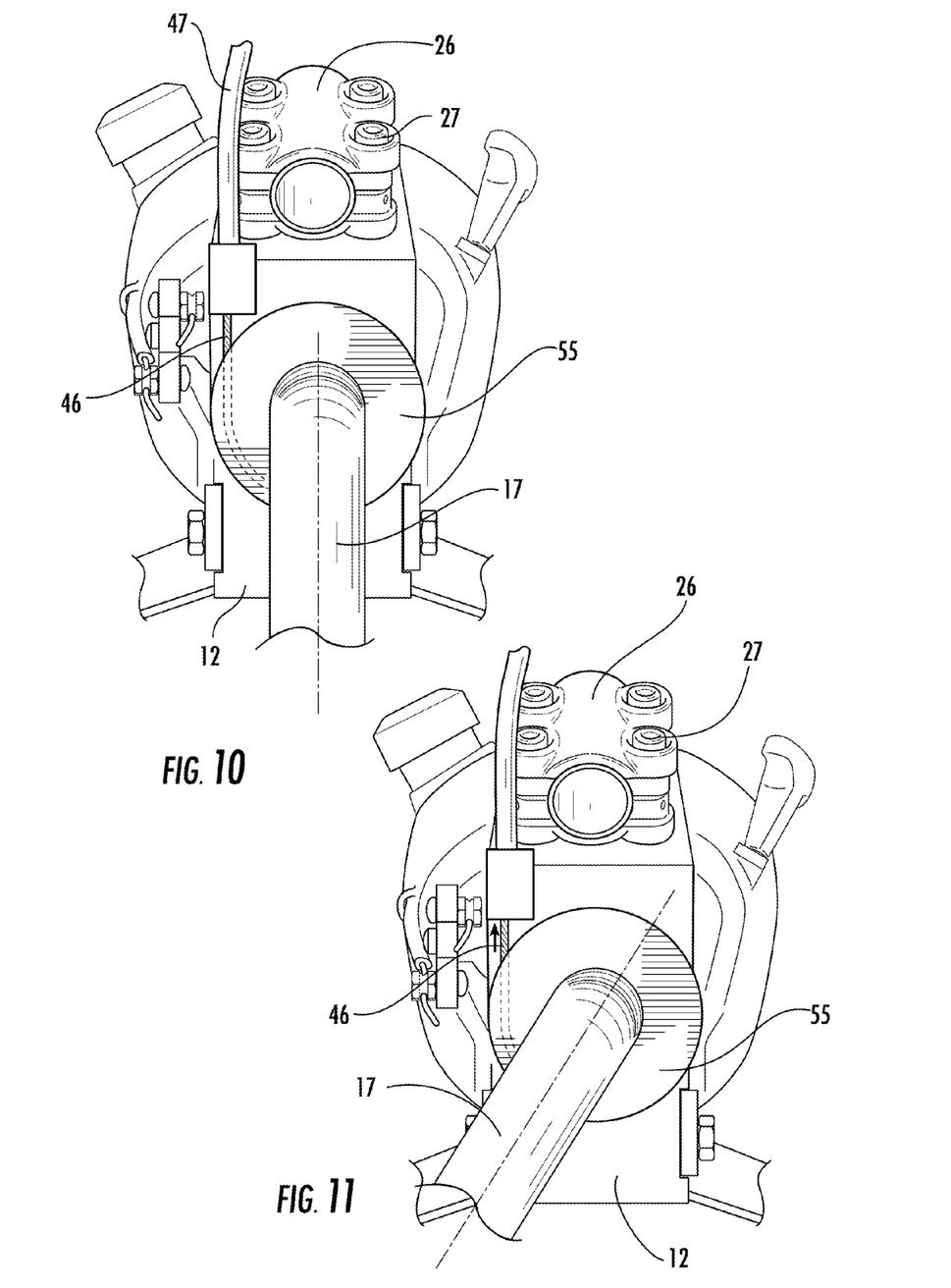
FIGS. 10-12 schematically depict the rotation of a drive-shaft-housing pulley so that a trimmer portion is rotated from a trimming position to an edging position.
Figure 12:
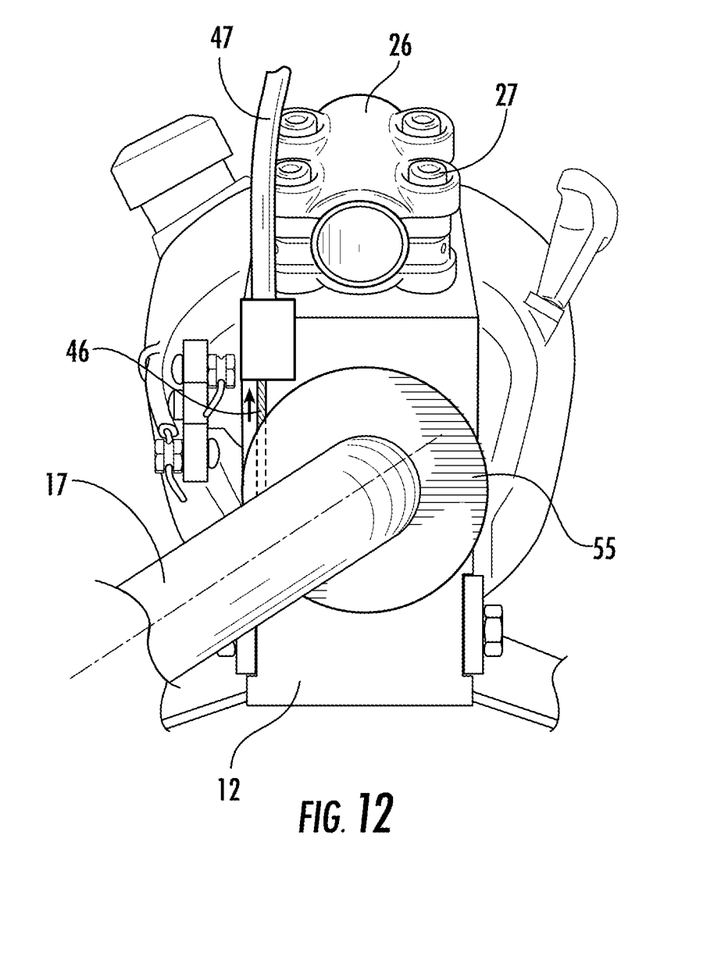

FIGS. 10-12 depict the rotation of the drive-shaft-housing pulley 55 so that the trimmer portion 20 is rotated from the trimming position to the edging position. FIG. 10 depicts the drive-shaft-housing pulley 55 and the drive-shaft housing 17 being positioned so that trimmer portion 20 is in the trimming position. The winding the pulley cable 46 around the handle-bar pulley 45 causes the pulley cable 46 to unwind from around the drive-shaft-housing pulley 55. As depicted in FIGS. 11-12, this unwinding of the pulley cable 46 causes the drive-shaft-housing pulley 55 and the drive-shaft housing 17 to rotate (e.g., clockwise) so that the trimmer portion 20 is rotated to the edging position. Similarly, the winding of the pulley cable 46 around the drive-shaft-housing pulley 55 causes the pulley cable 46 to unwind from around the handle-bar pulley 45, thereby returning the trimmer portion 20 to the trimming position.

To supplement the present disclosure, this application incorporates entirely by reference the following patents and patent application publications: U.S. Pat. No. 4,077,191; U.S. Pat. No. 4,936,886; U.S. Pat. No. 5,423,126; U.S. Pat. No. 5,577,374; U.S. Pat. No. 5,970,694; U.S. Pat. No. 7,584,542; U.S. Patent Application Publication No. 2008/0134522; U.S. Patent Application Publication No. 2008/0282554; and U.S. Patent Application Publication No. 2009/0188354.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A string trimmer, comprising:
   a primary support;
   two or more wheels attached to said primary support;
   an engine attached to said primary support;
   a trimmer portion, said trimmer portion comprising a rotatable trimmer head and cutting line attached to said rotatable trimmer head, wherein said rotatable trimmer head defines a cutting plane, wherein said trimmer portion is capable of rotating between a trimming position and an edging position;
   a drive shaft in communication with said engine and said rotatable trimmer head, said drive shaft being capable of transferring rotational motion from said engine to said rotatable trimmer head;
   a drive-shaft housing connecting said trimmer portion to said primary support, said drive-shaft housing substantially enclosing said drive shaft;
   a rotatable handle bar in communication with said trimmer portion, said rotatable handle bar comprising a first handle-bar portion and a second handle-bar portion, wherein said first handle-bar portion is in a user position when said trimmer portion is in a trimmer position such that a cutting plane of said trimmer portion is substantially parallel to the ground, wherein said second handle-bar portion is in a user position when said trimmer portion is in an edging position such that the cutting plane of said trimmer portion is substantially perpendicular to the ground, and wherein said second handle bar is positioned on the opposite side of the string trimmer as said trimmer portion when said trimmer portion is in an edging position;
   a handle-bar support connecting said rotatable handle bar to said primary support;
   a handle-bar pulley attached to said rotatable handle bar;
   a drive-shaft-housing pulley attached to said drive-shaft housing; and
   a pulley cable attached to said handle-bar pulley and to said drive-shaft-housing pulley;
   wherein said first handle-bar portion is substantially parallel to the ground and said second handle-bar portion is substantially perpendicular to the ground in the trimmer position;

wherein said first handle-bar portion is substantially perpendicular to the ground and said second handle-bar portion is substantially parallel to the ground in the edging position; and wherein said handle-bar pulley, said drive-shaft-housing pulley, and said pulley cable are in mechanical communication to affect movement of said trimmer portion between the trimming and edging position.

2. A string trimmer according to claim 1, further comprising a locking mechanism attached to said handle-bar support, wherein, when said locking mechanism is engaged, said locking mechanism prevents rotation of said handle-bar pulley.

3. A string trimmer according to claim 1, wherein:
said handle-bar pulley comprises a first locking groove and a second locking groove, said locking mechanism being capable of engaging said locking grooves;
when said first locking groove is engaged by said locking mechanism, said first handle-bar portion is in a user position; and
when said second locking groove is engaged by said locking mechanism, said second handle-bar portion is in a user position.

4. A string trimmer according to claim 1, further comprising a pulley-cable jacket substantially enclosing said pulley cable.

5. A string trimmer according to claim 1, wherein winding said pulley cable around said handle-bar pulley causes said pulley cable to unwind from around said drive-shaft-housing pulley.

6. A string trimmer according to claim 1, wherein winding said pulley cable around said drive-shaft-housing pulley causes said pulley cable to unwind from around said handle-bar pulley.

7. A string trimmer according to claim 1, further comprising a gear box attached to said trimmer portion, said gear box comprising gears in communication with said drive shaft and said rotatable trimmer head, said gears being capable of transferring rotational motion from said drive shaft to said rotatable trimmer head.

8. A string trimmer according to claim 1, further comprising a kill switch in communication with said engine.

9. A string trimmer according to claim 1, further comprising:
a throttle handle connected to handle-bar support;
a throttle control lever attached to said handle-bar support; and
a throttle cable in communication with said throttle control lever and said engine.

10. A string trimmer according to claim 1, wherein said engine is an electric motor.

11. A string trimmer according to claim 1, wherein said engine is a gasoline engine.

12. A string trimmer according to claim 1, wherein, when said trimmer portion is in a trimming position, the cutting plane is approximately parallel to a flat surface, if the string trimmer were positioned on the flat surface.

13. A string trimmer according to claim 1, wherein, when said trimmer portion is in an edging position, said rotatable trimmer head is positioned such that the cutting plane is at an angle of between about 30 degrees and 90 degrees relative to a flat surface, if the string trimmer were positioned on the flat surface.

14. A string trimmer according to claim 1, wherein said rotatable trimmer head rotates counterclockwise.

\* \* \* \* \*